United States Patent
Saito et al.

(10) Patent No.: US 6,916,998 B2
(45) Date of Patent: Jul. 12, 2005

(54) WEIGHT MEASURING DEVICE AND PERSON WEIGHT MEASURING EQUIPMENT INCLUDING THE WEIGHT MEASURING DEVICE

(75) Inventors: Kiyoshi Saito, Osaka (JP); Shusaku Kawasaki, Osaka (JP); Shigehiro Yoshiuchi, Osaka (JP); Tsuyoshi Tanaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 76 days.

(21) Appl. No.: 10/311,474

(22) PCT Filed: Apr. 15, 2002

(86) PCT No.: PCT/JP02/03720

§ 371 (c)(1),
(2), (4) Date: Jun. 23, 2003

(87) PCT Pub. No.: WO02/084233

PCT Pub. Date: Oct. 24, 2002

(65) Prior Publication Data

US 2004/0094337 A1 May 20, 2004

(30) Foreign Application Priority Data

Apr. 16, 2001 (JP) ........................................ 2001-116599
Feb. 14, 2002 (JP) ........................................ 2002-036497
Feb. 18, 2002 (JP) ........................................ 2002-039504

(51) Int. Cl.[7] ........................ B60R 21/32; G01G 19/52; B60K 28/04

(52) U.S. Cl. ........................ 177/144; 180/273; 280/735
(58) Field of Search ................................ 177/136, 144, 177/210 R; 180/273; 280/735

(56) References Cited

U.S. PATENT DOCUMENTS

| 6,323,444 B1 | 11/2001 | Aoki ........................... 177/144 |
| 6,448,512 B1 * | 9/2002 | Cooper ........................ 177/144 |
| 6,748,814 B2 * | 6/2004 | Ishida et al. ........... 73/862.391 |

FOREIGN PATENT DOCUMENTS

| JP | 11-001153 | 1/1999 |
| JP | 2000-258232 | 9/2000 |

* cited by examiner

*Primary Examiner*—Randy W. Gibson
(74) *Attorney, Agent, or Firm*—Wenderoth, Lind & Ponack, L.L.P.

(57) ABSTRACT

A weight measuring device comprising a base fixed to an object, a strain detection substrate fixed to the base, a fitting pin fixed to the strain detection substrate, an arm rotatably attached to the base by a support pin, and a leaf spring with one end fixed to the arm and the other end supported by the fitting pin. The weight measuring device further comprises a second arm with one end receiving the load of the object to be measured and the other end fixed to the arm through a link pin. By the configuration of the present invention, the load applied to the strain detection substrate is reduced, and a weight measuring device improved in detecting resolution is obtained. Furthermore, the weight measuring device of the present invention is unitized, and the weight measuring device can be easily built into various equipment.

33 Claims, 19 Drawing Sheets

Back-and-Forth direction

WEIGHT MEASURING DEVICE AND PERSON WEIGHT MEASURING EQUIPMENT INCLUDING THE WEIGHT MEASURING DEVICE

TECHNICAL FIELD

The present invention relates to a weight measuring device for measuring weights of objects, and driver and passenger (hereinafter referred to as "person") weight measuring equipment for vehicles using the same.

BACKGROUND ART

Recently, there has been a trend toward controlling the operation of safety equipment according to the weight and constitution of a person's body in order to improve the performance of seat belts and air bags. For example, the vehicle judges whether the person getting therein is a child or an adult, and adjusts an expanding gas quantity and an expanding speed or stops the operation of the air bag. Therefore, it is necessary to know the weight of the person sitting on the seat by using some means. As an example of such means, a system is proposed in that a strain sensor (load cell) is disposed at four corners of seat rails in order to measure the weight of the person by adding the loads vertically applied to the load cell (Japanese Patent Laid-open Publication H11-1153).

As for a strain sensor for the person weight measuring equipment, there is a demand for a small-sized sensor whose maximum measuring load is about 50 kg. As such strain sensors, there are those having a strain gauge stuck (or formed) on a sensor plate which is deformed by the load, those based on a piezoelectric system, and those using a static capacity sensor for detecting the displacement of an elastic member which is deformed by the load.

In a case of such a weight measuring device and person weight measuring equipment using same, the load of the object to be measured is directly applied to the strain detectors disposed in the equipment. Therefore, there arises a problem of a reduction in detecting resolution if priority is given to an assurance of strength of the detectors.

The present invention is intended to address such problem, and the object of the invention is to provide a weight measuring device and a person weight measuring equipment using the same. The weight measuring device can improve the detecting resolution by reducing the load applied to the strain detector as much as possible.

DISCLOSURE OF THE INVENTION

The weight measuring device of the present invention comprises a base fixed to an object, a strain detection substrate attached to the base, a fitting pin attached to the strain detection substrate, an arm rotatably attached to the base by a support pin, and a leaf spring with one end attached to the arm and the other end supported by the fitting pin. Also, the weight measuring device of the present invention further comprises a second arm with one end receiving the load of the object to be measured and the other end connected to the arm by a link pin. By the configuration of the present invention, a weight measuring device has a reduced load applied to the strain detection substrate and has an improved detecting resolution. Also, the measuring device of the present invention is unitized and can be easily built in various types of equipment.

DETAILED DESCRIPTION OF THE INVENTION

First Preferred Embodiment

Figure 1:
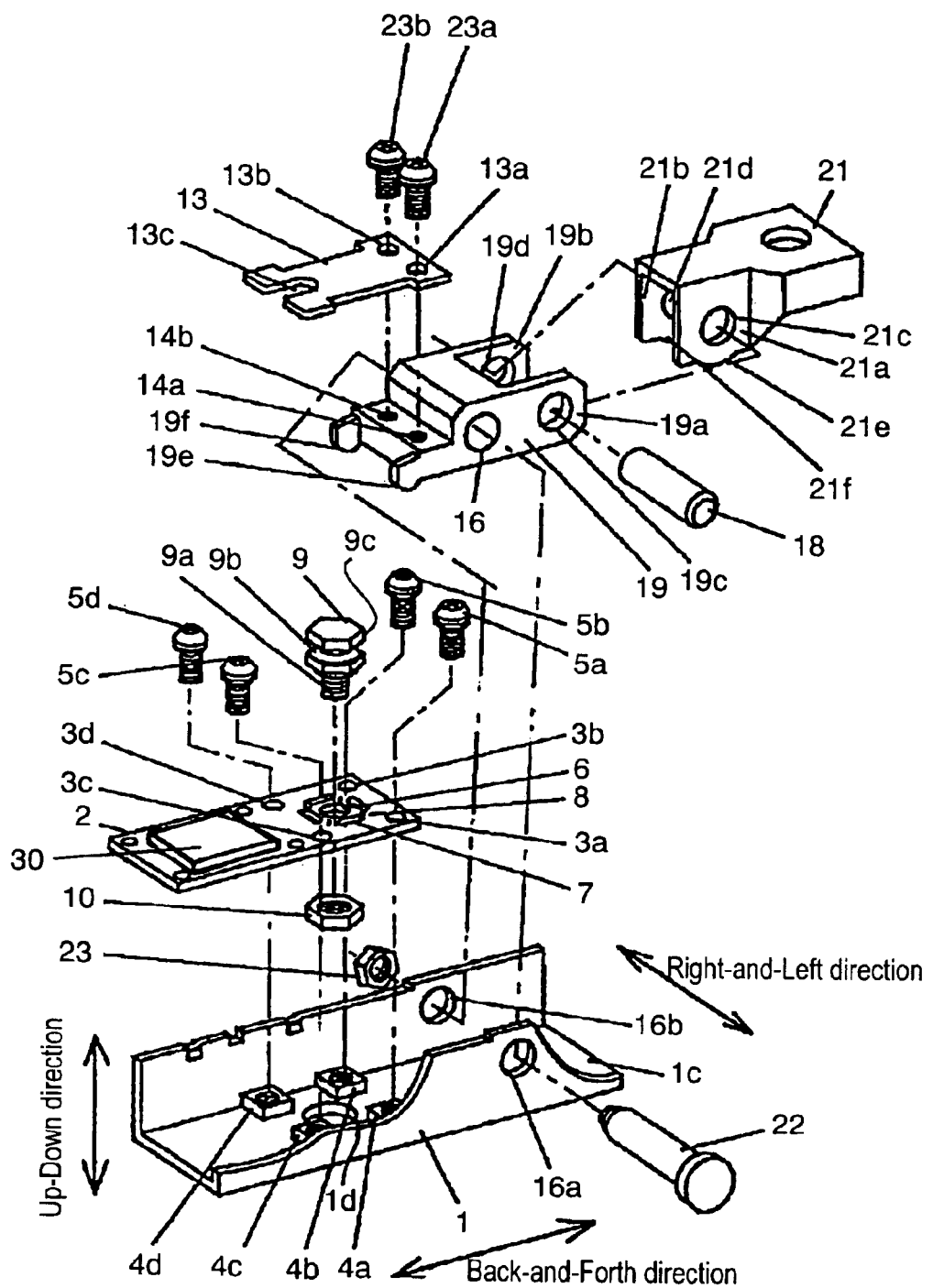
FIG. 1 is an exploded perspective view of a first preferred embodiment of the present invention.
Figure 2:
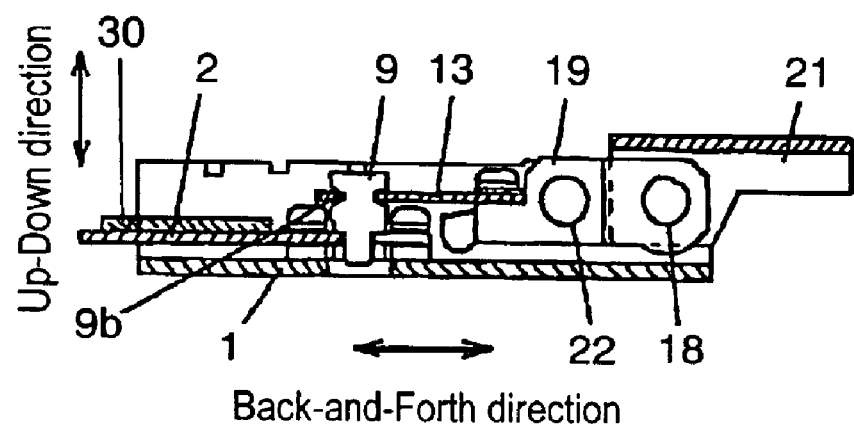
FIG. 2 is a side sectional view of the first preferred embodiment of the present invention.
Figure 3:
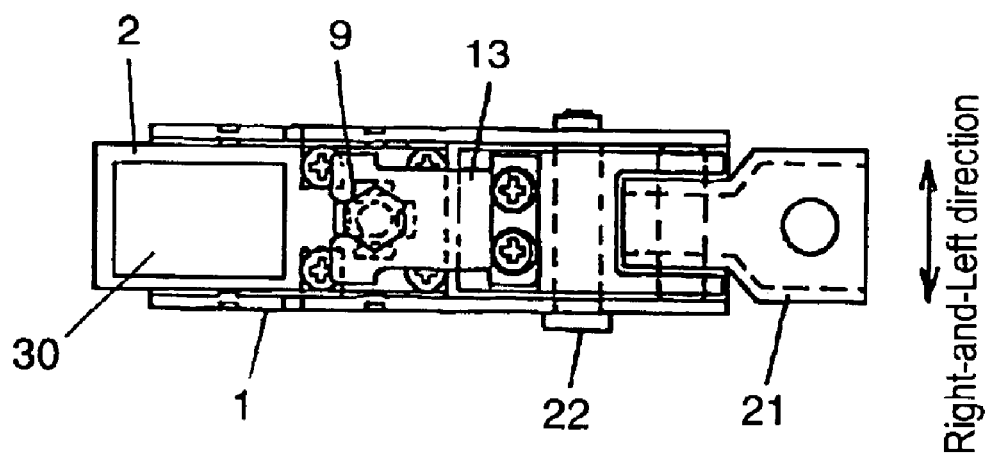
FIG. 3 is a plan view of the first preferred embodiment of the present invention.

The weight measuring device (hereafter referred to as "device") in the first preferred embodiment of the present invention will be described with reference to FIG. 1 through FIG. 3. FIG. 1 is an exploded perspective view of the present preferred embodiment. FIG. 2 is a side sectional view of the present preferred embodiment. FIG. 3 is a plan view of the present preferred embodiment.

In FIG. 1, strain detection substrate 2 is fixed to base 1, which is to be fixed to an object (not shown), with screws 5a, 5b, 5c, 5d screwed into tapped holes 4a, 4b, 4c, 4d through holes 3a, 3b, 3c, 3d. Hole 6 as a point of action at which the load is applied is provided at a point where a straight line connecting the fixing holes 3a and 3d crosses a straight line connecting the holes 3b and 3c. Slots 7 for generating a strain of a detectable level, and strain resistor 8 whose resistance varies depending upon the amount of strain are formed around the hole 6.

Fitting pin 9 is made of a material that can withstand more load than the measuring load. At an end of fitting pin 9 is formed threaded portion 9a, and at a hexagonal head 9c of fitting pin 9 is formed insert portion 9b. Also, the fitting pin 9 is inserted into the hole 6 of the strain detection substrate 2 and fixed by nut 10. And the base 1 is provided with relief hole 1d.

Arm 19 is provided with hole 16, and is rotatably supported by support pin 22 between rotation support holes 16a and 16b formed in the side wall of the base 1. Also, slide holes 19c, 19d are respectively formed in wing portions 19a and 19b extending from one end of the arm 19. Second arm 21 is made from a plate material generally U-shaped, which receives the load of the object to be measured and is vertically movable. Holes 21c, 21d are respectively formed in bent wing portions 21a, 21b so that link pin 18 passes therethrough and the second arm 21 can rotate. With the link pin 18 inserted through the slide holes 19c, 19d and holes 21c, 21d, the second arm 21 is rotatably supported along with the arm 19.

At one end of leaf spring 13 are disposed fixing holes 13a, 13b in positions corresponding to tapped holes 14a, 14b of the arm 19, and at another end thereof is disposed U-shaped notch 13c. The notch 13c is inserted to the insert portion 9b of the fitting pin 9. Also, the leaf spring 13 is designed so as to be provided with specific spring characteristics according to the measuring load.

A method of assembling these components will be described in the following.

First, the fitting pin 9 is fixed to the strain detection substrate 2 by using the nut 10. Next, the strain detection substrate 2 is fixed to the base 1 by using the screws 5a to 5d. Also, the leaf spring 13 is fixed to the arm 19 with screws 23a, 23b. Further, the arm 21 is connected to the arm 19 by using the link pin 18. In this state, the U-shaped notch 13c of the leaf spring 13 is inserted to the insert portion 9b of the fitting pin 9, and the arm 19 is supported by support pin 22 on the base 1. The support pin 22 is fixed by nut 23.

The operation of the device will be described in the following with reference to FIG. 2.

When the weight of the object to be measured is applied via the arm 21 of the device assembled as described above, a force acts on the arm 21 to move it downward about the support pin 22 as a fulcrum. The force is transferred via the arm 19 to move the leaf spring 13 upward. This works as a force to pull up the fitting pin 9 fixed to the strain detection substrate 2, generating a strain in the strain detection substrate 2 according to the pulling force. The resistance of strain resistor 8 changes according to the strain, and the change of the resistance is computed in processing circuit 30 to measure the load. To achieve the purpose that a strain is generated in the strain detection substrate 2 but the strain detection substrate 2 is hardly deformed, the leaf spring 13 deforms so that the deformation due to the weight of the object to be measured via the arm 21 is absorbed by the leaf spring 13.

In this case, the ratio of the distance between the fitting pin 9 and the support pin 22 and the distance from the support pin 22 to the link pin 18 is freely variable, and therefore, it is possible to greatly reduce the load applied to the strain detection substrate 2 in order to enhance the detecting resolution.

Particularly, by increasing the ratio of the distance between the fitting pin 9 and the support pin 22 and the distance from the support pin 22 to the link pin 18 two times or more, it is possible to further reduce the load applied to the strain detection substrate 2 and to more improve the load detecting resolution.

Also, since the equipment of the present preferred embodiment is unitized, it is easy to build the device into various types of equipment. Further, the number of assembling steps can be reduced, and it is unnecessary to adjust sensor characteristics at the time of assembly.

The above configuration involves no problem in the case of normal weight measurement, but when a load exceeding the maximum measuring load is applied to the device via the arm 21, the load is also applied to the leaf spring 13 and strain detection substrate 2. As a result, there is a possibility of permanent deformation or damage of the leaf spring 13, or breakdown of the strain detection substrate 2. As a countermeasure, a possible method is to increase the withstanding characteristics of the leaf spring 13 and strain detection substrate 2. However, increasing the withstanding characteristics of leaf spring 13 causes the equipment to increase in size, and increasing the withstanding characteristics of strain detection substrate 2 decreases the amount of strain with respect to the load in the measuring range, resulting in lowering of the measuring resolution.

In order to address the above problems, as shown in FIG. 1, the wing portions 21a, 21b of the arm 21 are partly provided with projections 21e, 21f facing toward the base 1, and when the second arm 21 rotates about the support pin 22 to move down, reaching a specific stroke, then the arm comes into contact with the bottom plate 1c of the base 1. In this case, the stroke is generally designed to be 2 mm in connection with the maximum measuring load. On the other hand, when a load in a tensile direction is measured, projections 19e and 19f disposed at ends of the arm 19 and facing toward the base 1 come into contact with the bottom plate 1c of the base 1. The stroke is similarly designed to be 2 mm.

In the above configuration, when the load exceeds the maximum measuring load, a stopper is formed between the projections 21e, 21f disposed on the arm 21 or the projections 19e, 19f disposed on the arm 19 and the bottom plate 1c of the base 1. Accordingly, even when a load or impact load exceeding the maximum measuring load is applied, the stopper structure receives the load, and thereby, makes it possible to prevent the breakdown of strain detection substrate 2 and leaf spring 13.

Further, the dimensions in the widthwise direction (right-and-left direction in FIG. 1) and lengthwise direction (back-and-forth direction in FIG. 1) of the notch 13c formed in the end of leaf spring 13 are set larger than the diameter of the insert portion 9b of the fitting pin 9. The purpose is to prevent a force from being directly applied to the insert portion 9b of the fitting pin 9 when an abnormal force is applied to the object to be measured or to the device, in the back-and-forth direction, or in right-and-left direction, during the measurement or in standby mode of the device. For example, when such abnormal load is supposed to be an impact load caused due to a collision of vehicles, the load then applied is 2,000 kg or more. Even in that case, the device of the present preferred embodiment will not break down due to the durability of the support pin 22 and the base 1, and in the course of impact application, the impact is absorbed as the support pin 22 and each structure deform a little. The size of the notch 13c of leaf spring 13 is determined so as to provide a clearance according to such deformation. Thus, it is possible to prevent the breakdown of the strain detection substrate 2 even when impacts are applied to the device from the back-and-forth direction and the right-and-left direction.

Second Preferred Embodiment

The weight measuring device (hereafter referred to as device) in the second preferred embodiment of the present invention will be described with reference to FIG. 4 to FIG. 9c.

Figure 4:
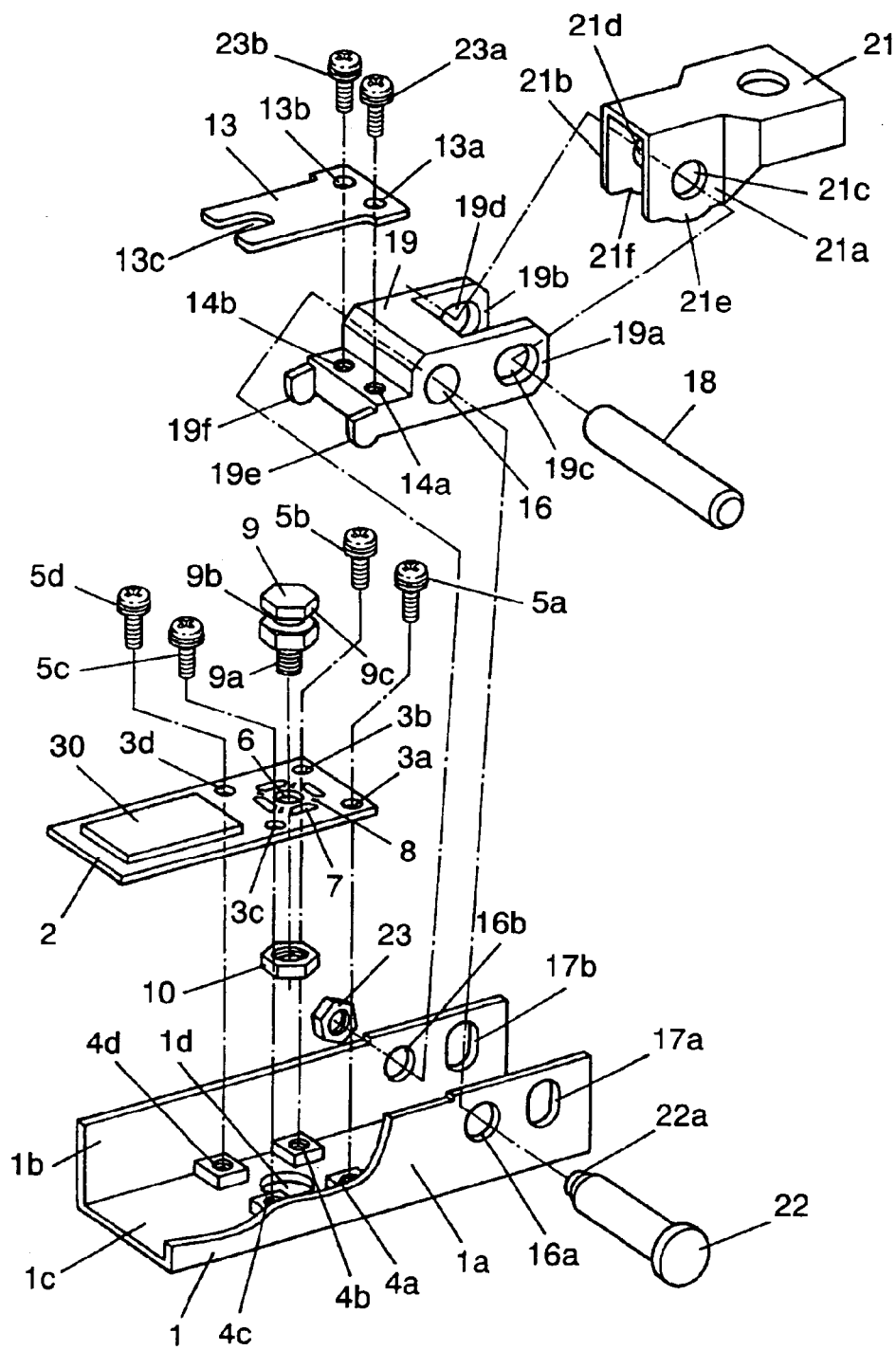
FIG. 4 is an exploded view of a second preferred embodiment of the present invention.

In FIG. 4, U-shaped base 1 is fixed by bolt 51 to an object such as a chassis 50. Side plates 1a, 1b are provided with rotation support holes 16a, 16b for the support pin 22, and guide holes 17a, 17b for the link pin 18. Bottom plate 1c is provided with tapped holes 4a, 4b, 4c, 4d for fixing the strain detection substrate 2, and the relief hole 1d for threaded portion 9a of the fitting pin 9 and the nut 10.

The structure, arrangement, and function of the strain detection substrate 2, the fitting pin 9, and the leaf spring 13 are the same as those in the first preferred embodiment.

The arm 19 is provided with the hole 16, and is rotatably supported by the support pin 22 between the rotation support holes 16a, 16b formed in the side plates 1a, 1b of the base 1, which does not slip off due to threaded portion 22a formed at the end of the support pin 22, and the nut 23. Also, the wing portions 19a, 19b extending from one end of the arm 19 are respectively provided with slide holes 19c, 19d for guiding the link pin 18 so that the pin moves in the horizontal direction. Further, the projections 19e, 19f facing toward the bottom plate 1c of the base 1 are disposed at the end of the arm 19.

The second arm 21 receives the load of the object to be measured and is vertically movable and is formed of U-shaped plate material. The link pin 18 goes through the holes 21c, 21d formed in the bent wing portions 21a, 21b of arm 21, the slide holes 19c, 19d of arm 19, and the guide holes 17a, 17b, or slots for guiding the pin vertically, disposed in the side plates 1a, 1b of the base 1. The link pin 18 is provided with an E-ring, which is not shown, to prevent the link pin 18 from slipping off. Also, the wing portions 21a, 21b are partly provided with the projections 21e, 21f facing toward the bottom 1c of the base 1.

A method of assembling these components is described in the following.

First, the fitting pin 9 is fixed to the strain detection substrate 2 by using the nut 10. Next, the strain detection substrate 2 is fixed to the base 1 with screws 5a, 5b, 5c, 5d. Also, the leaf spring 13 is fixed to the arm 19 with screws 23a, 23b. The U-shaped notch 13c of the leaf spring 13 is inserted into the insert portion 9b of the fitting pin 9, and the arm 19 is supported by the support pin 22 on the base 1. The support pin 22 is fixed by nut 23. Further, the slide holes 19c, 19d of the arm 19, the holes 21c, 21d of the arm 21, and the guide holes 17a, 17b of the base 1 are aligned with each other, through which the link pin 18 is inserted and attached to the arm 19, and an E-ring or the like is attached to prevent the pin from slipping off.

Figure 5:
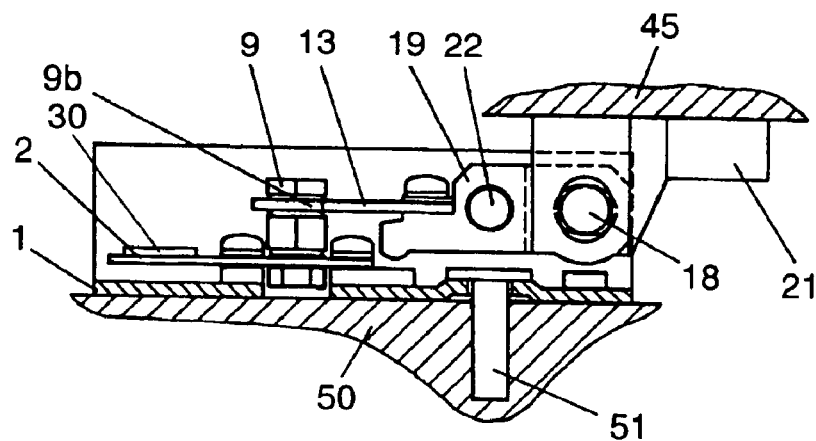
FIG. 5 is a side sectional view of the second preferred embodiment of the present invention.
Figure 6:
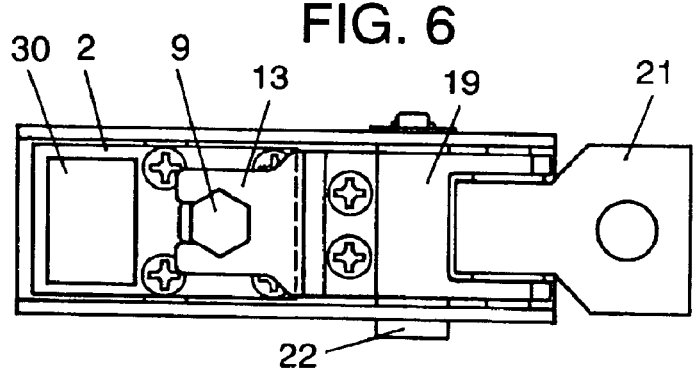
FIG. 6 is a plan view of the second preferred embodiment of the present invention.

Next, the operation of the device is described with reference to FIG. 5 and FIG. 6. FIG. 5 is a sectional view of the device completed as described above and mounted on a seat truck 45 of a vehicle seat and a chassis 50, and FIG. 6 is a plan view of the device.

In FIG. 5, when the weight of the object to be measured is applied to the arm 21, a force acts on the arm 21 to move it downward about the support pin 22. The force is transferred via the arm 19 to move the leaf spring 13 upward. This works as a force to pull up the fitting pin 9 fixed to the strain detection substrate 2, generating a strain in the strain detection substrate 2 according to the force. The resistance of the strain resistor 8 changes with the strain, and the change of the resistance is computed in the processing circuit 30 to measure the load. To achieve the purpose that the strain occurs in the strain detection substrate 2, it is but hardly deformed, the leaf spring 13 deforms so that the deformation due to the weight of the object to be measured via the arm 21 is absorbed by the leaf spring 13.

Particularly, at the link mechanism portion where the arm 21 and the arm 19 are rotatably connected by the link 18, a locus deviation of the linear motion in the vertical direction of arm 21 from the circular motion of the arm 19 about the link pin 18 is mechanically buffered. This mechanism is described in the following with reference to FIG. 7.

Figure 7:
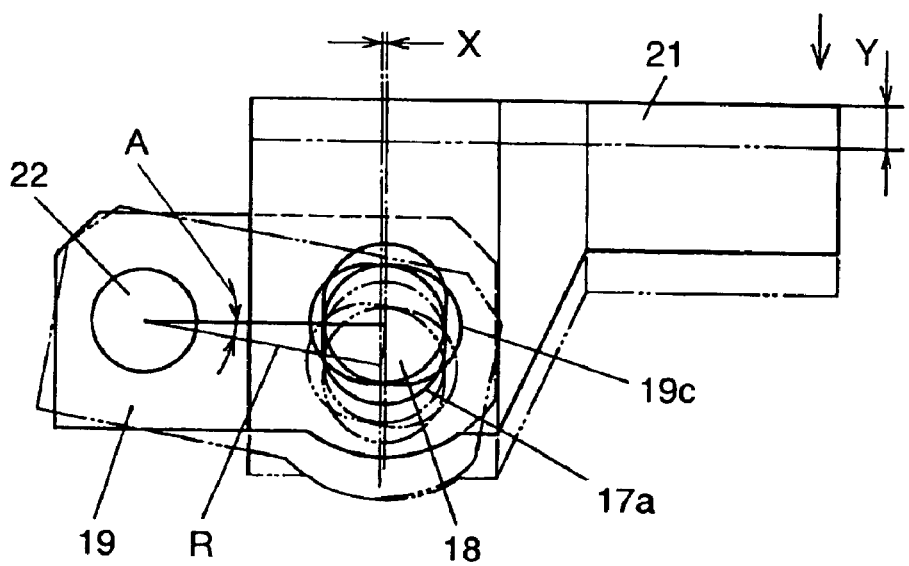
FIG. 7 is a partly detailed view for describing the operation of an arm.

For example, when the arm 21 is displaced downward by Y with a load applied thereto, the arm 19 is accordingly rotated by angle A with turning radius R about the shaft 22. At the time, the locus of the arm 21 is linear, while the locus of the arm 19 is circular, and therefore, locus deviation X is generated as shown in FIG. 7. Here, an angle A due to the displacement Y and the resultant deviation X are determined by the following equations 1 and 2.

$$A = \sin^{-1}(Y/R) \tag{1}$$

$$X = R \cos(\sin^{-1}(Y/R)) \tag{2}$$

Lengthwise dimensions of the slide holes 19c, 19d are determined in anticipation of the deviation X. Also, lengthwise dimensions of the guide holes 17a, 17b are determined taking into account the stroke of arm 21. In this way, it is possible to reduce a detection error superposed on the load. The error occurs when a frictional force is generated on the slideway by an elastic repulsion due to the locus deviation, and the frictional force is superposed on the load. And it is also possible to reduce a hysteresis on a characteristic curve. In this way, highly accurate device is obtained.

Figure 8A:
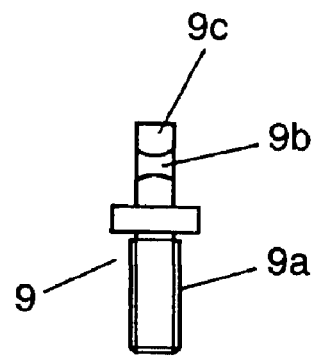
FIG. 8A is a front view of a fitting pin showing a modified configuration of the second preferred embodiment of the present invention.
Figure 8B:
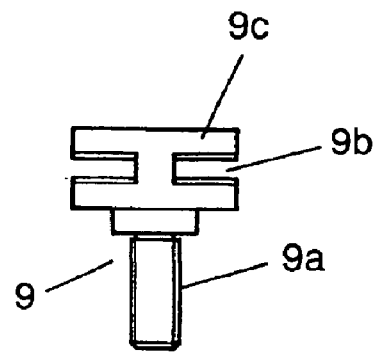
FIG. 8B is a side view of the modified configuration of the second preferred embodiment of the present invention.
Figure 8C:
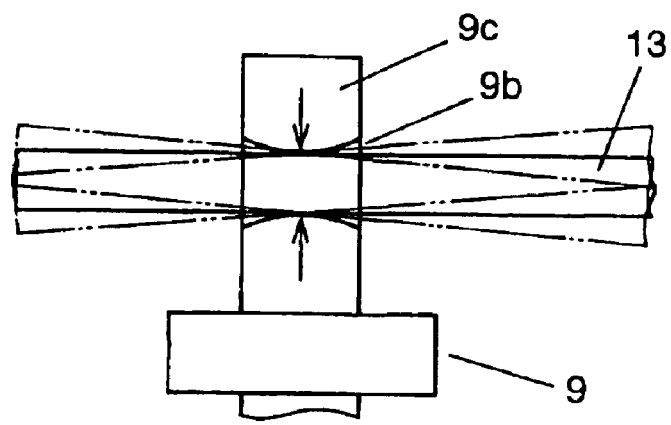
FIG. 8C is a partly detailed view of the modified configuration of the second preferred embodiment of the present invention.

Also, as shown in FIG. 8A and FIG. 8B, as a front view and a side view of the fitting pin 9, the fitting pin 9 may have an arcuate inner wall at the insert portion 9b. Thus, as shown in FIG. 8C, the load acting portion is linearly concentrated, reducing the variation in acting position of the load transferred to the fitting pin 9, thereby improving the detection accuracy.

Figure 9A:
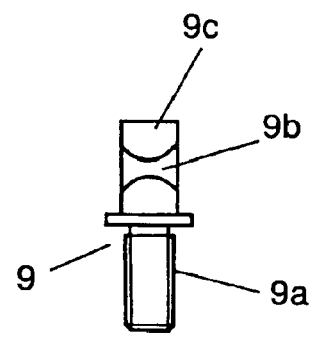
FIG. 9A is a front view of a fitting pin showing a second modified configuration of the second preferred embodiment of the present invention.
Figure 9B:
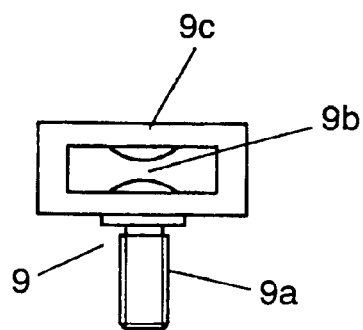
FIG. 9B is a side view of the second modified configuration of the second preferred embodiment of the present invention.
Figure 9C:
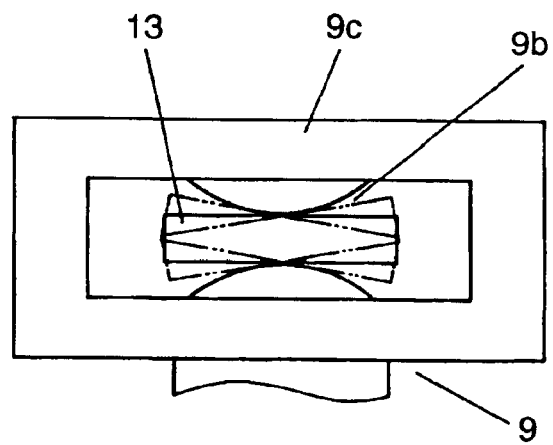
FIG. 9C is a partly detailed view of the second modified configuration of the second preferred embodiment of the present invention.

Also, as shown in FIG. 9A and FIG. 9B as the front view of and the side view of the fitting pin 9, the fitting pin 9 may have a semicircular inner wall at the insert portion 9b. Thus, as shown in FIG. 9C, the load acting portion is linearly concentrated, reducing the variation in acting position of the load transferred to the fitting pin 9, thereby improving the detection accuracy. The resultant effect is the same as the fitting pin 9 shown in FIGS. 8A–8C, but the detection accuracy is further improved because of suppressing the transfer of unnecessary load generated due to a distortion of the leaf spring 13.

Also, the wing portions 21a, 21b of the arm 21 are partly provided with the projections 21e, 21f facing toward the bottom plate 1c of the base 1 to prevent the leaf spring 13 and the strain detection substrate 2 from a permanent deformation or a breakdown when a load exceeding the maximum measuring load is applied to the arm 21. When the arm 19 rotates downward about the support pin 22, reaching the specific stroke, the projections 21e, 21f come into contact with the bottom plate 1c of the base 1. On the other hand, in a case of measuring a tensile load, projections 19e, 19f facing toward the bottom plate 1c of the base 1, disposed at the end portions of the arm 19, similarly come into contact with the bottom plate 1c of the base 1.

Third Preferred Embodiment

Figure 10:
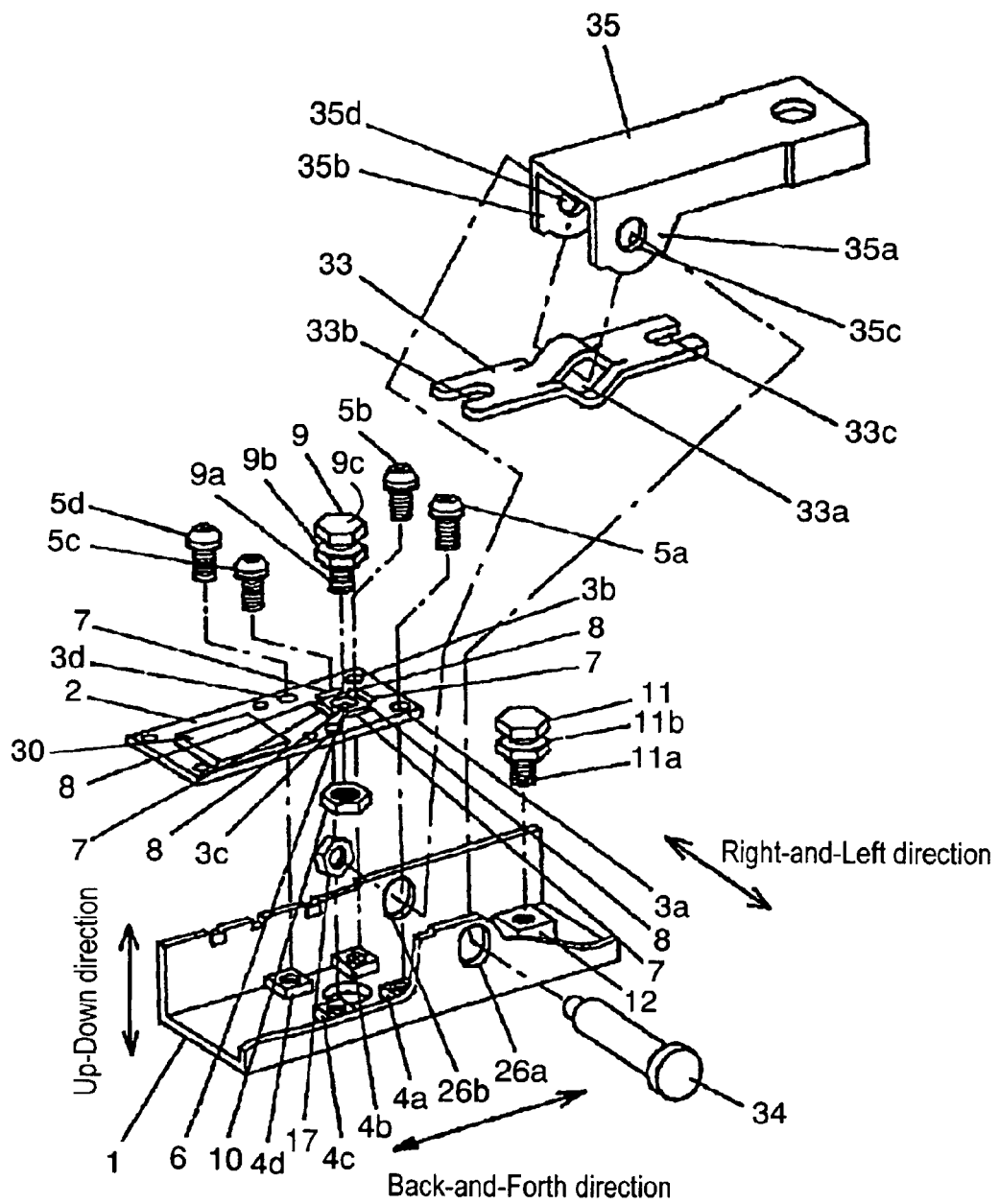
FIG. 10 is an exploded perspective view of a third preferred embodiment of the present invention.
Figure 11:
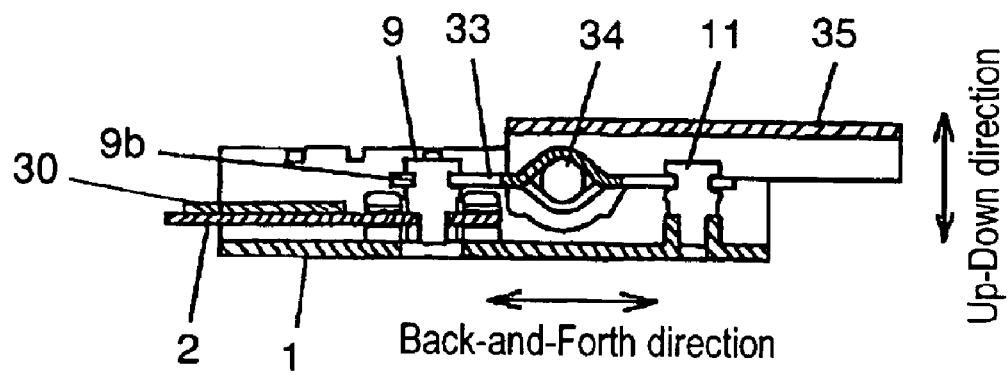
FIG. 11 is a side sectional view of the third preferred embodiment of the present invention.
Figure 12:
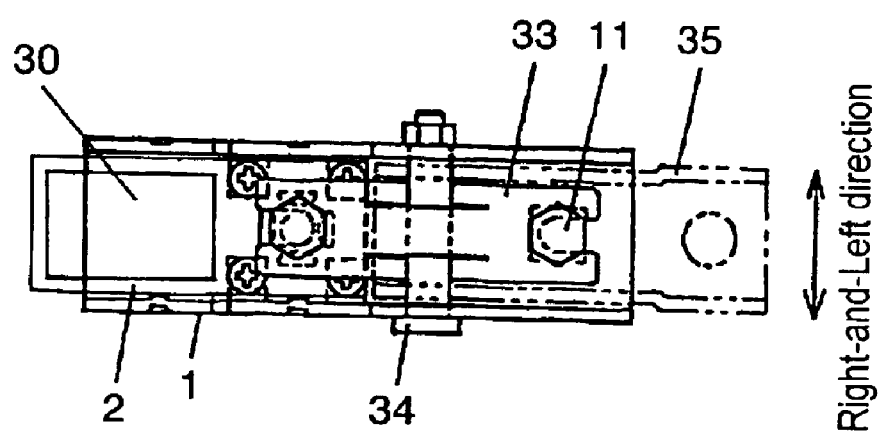
FIG. 12 is a plan view of the third preferred embodiment of the present invention.

A weight measuring device in the third preferred embodiment of the present invention will be described with reference to FIG. 10 through FIG. 12. FIG. 10 is an exploded perspective view of the device. FIG. 11 is a side sectional view of the device. FIG. 12 is a plan view of the device. In the description, phases such as "up-and-down", "back-and-forth" and "right-and-left", correspond to the directions of the arrows shown in FIG. 10.

In the present preferred embodiment, the structure, position, and function of base 1 fixed to an object (not shown), strain detection substrate 2, and fitting pin 9 are the same as those in the first preferred embodiment.

The device of the present preferred embodiment includes a fixing pin 11 as a support portion of a leaf spring 33. The fixing pin 11 is made of a material that can withstand a load higher than the measuring load, the same as the fitting pin 9. The fixing pin 11 is provided with a threaded portion 11a at an end portion, and an insert portion 11b at a hexagonal head portion, which is fixed in a tapped hole 12 of the base 1. Also, it is so configured that the insert portion 9b of fitting pin 9 and the insert portion 11b of fixing pin 11 are substantially the same in height when the base 1 is attached with the strain detection substrate 2 including the fitting pin 9, and the fixing pin 11.

As shown in FIG. 10, a guide hole 33a for a shaft 34 is formed nearly in the middle of the leaf spring 33. As a method of making the guide hole 33a, it is preferable to employ a method of deformation processing of the leaf spring 33 as shown in FIG. 10 or a method of combination with other member (not shown). Also, a dimension of the guide hole 33a with the shaft 34 inserted is made to be substantially free of play in the right-and-left direction, and the back-and-forth direction. There are provided U-shaped notches 33b, 33c at both ends of the leaf spring 33.

The notches 33b, 33c are respectively inserted into the insert portion 9b of the fitting pin 9 and the insert portion 11b of the fixing pin 11 in such a manner that the pins are vertically immovable. Also, the leaf spring 33 is designed to have spring characteristics in accordance with the measuring load.

Arm 35 as a movable member which receives the load of the object to be measured and is vertically movable is formed of U-shaped plate. Bent wing portions 35a, 35b are respectively provided with holes 35c, 35d so that the arm 35 is able to rotate on the shaft 34.

A method of assembling these components will be described in the following.

First, the fitting pin 9 is fixed to the strain detection substrate 2 by the nut 10. Next, the strain detection substrate 2 is fixed to the base 1 with screws 5a–5d. Further, the notched portion 33b and the notched portion 33c of leaf spring 33 are respectively inserted into the insert portion 9b of fitting pin 9 and the insert portion 11b of the fixing pin 11. Under this condition, the fixing pin 11 is fixed in the tapped hole 12 of the base 1. Next, holes 35c, 35d and the guide hole 33a of the leaf spring 33 are aligned, and the shaft 34 is inserted therethrough, and then the leaf spring 33 and the arm 35 are assembled via slots 26a, 26b formed in the side wall of the base 1, and the shaft 34 is fixed with nut 17.

The operation will be described with reference to FIG. 11.

When the weight of the object to be measured is applied to the arm 35, the leaf spring 13 suspended between the fitting pin 9 fixed to the strain detection substrate 2 and the fixing pin 11 fixed to the base 1 receives the load and deforms in a state of being supported at both ends. At the time, since the load is concentrated nearly in the middle of the leaf spring 33, half of the weight of the object to be measured is applied to the action point of the strain detection substrate 2. A strain is generated in the detection substrate 2 in accordance with the load applied. Accordingly, a resistance of the strain resistor 8 changes, and the change of the resistance is computed in a processing circuit 30 to measure the load.

Also, in a case of measuring a tensile load, the arm 35 is pulled upward, and the leaf spring 33 deforms upward, and then a signal of opposite polarity is delivered from the strain detection substrate 2.

As is obvious in the present preferred embodiment, only half of the weight of the object to be measured is applied to the strain detection substrate 2, and thereby, it is possible to improve a load detecting resolution.

Also, since the device is unitized, even when the device is built in various types of equipment, it is easy to assemble and possible to reduce the number of assembling steps, and it is unnecessary to adjust the sensor characteristics during the assembly.

The above configuration involves no problem in the case of normal weight measurement, but when a load exceeding the maximum measuring load is applied to the device via the arm 35, the load is also applied to the leaf spring 33 and strain detection substrate 2. As a result, there is a possibility of a permanent deformation or damage of the leaf spring 33, or breakdown of the strain detection substrate 2. As a countermeasure, a possible method is to increase the withstanding strength of the leaf spring 33 and the strain detection substrate 2. However, increasing the withstanding strength of the leaf spring 33 causes the equipment to increase in size, and increasing the withstanding strength of strain detection substrate 2 decreases the strain with respect to the load in the measuring range, resulting in lowering of the measuring resolution.

In order to address this problem, as shown in FIG. 10, slots 26a, 26b are formed in the side walls of the base 1. The slots 26a, 26b are longer in the up-and-down direction than a diameter of the shaft 34, the length of which is set so as to allow the shaft 34 to be movable in the up-and-down direction for an amount of maximum deformation of the leaf spring 33 at a maximum measuring load applied. Thus, when the load exceeds the maximum measuring load, the shaft 34 comes in contact with the inner walls of slots 26a, 26b, and stops. Accordingly, even when a load or impact load higher than the maximum measuring load is applied, the stopper structure receives the load, and thereby, it is possible to prevent the breakdown of the strain detection substrate 2 or the leaf spring 33.

Further, as shown in FIG. 12, the dimensions in the widthwise direction (right-and-left direction in FIG. 10) and lengthwise direction (back-and-forth direction in FIG. 10) of the notches 33b, 33c formed in both ends of the leaf spring 33 are set larger than the diameters of the insert portion 9b of fitting pin 9 and the insert portion 11b of fixing pin 11. The purpose is to prevent a force from being directly applied to the insert portion 9b of fitting pin 9 when an abnormal force is applied in the back-and-forth and right-and-left directions, during the measurement or standby mode to the object to be measured, to the device, and to the mounting object. For example, when such abnormal load is supposed to be an impact load due to a collision of the vehicles, the load applied is 2,000 kg or more. Even in such a case, though, the device is designed not to break down owing to the withstanding strength of the shaft 34 and the base 1, in the course of the impact application, the impact is absorbed by little distortions of the shaft 34 and other structures. The dimensions of the notches 33b, 33c of the leaf spring 33 is decided so as to provide a clearance in accordance with such distortions. Thus, it is possible to prevent the breakdown of the strain detection substrate 2 even when impacts are applied to the equipment in back-and-forth and right-and-left directions.

Fourth Preferred Embodiment

Figure 13:
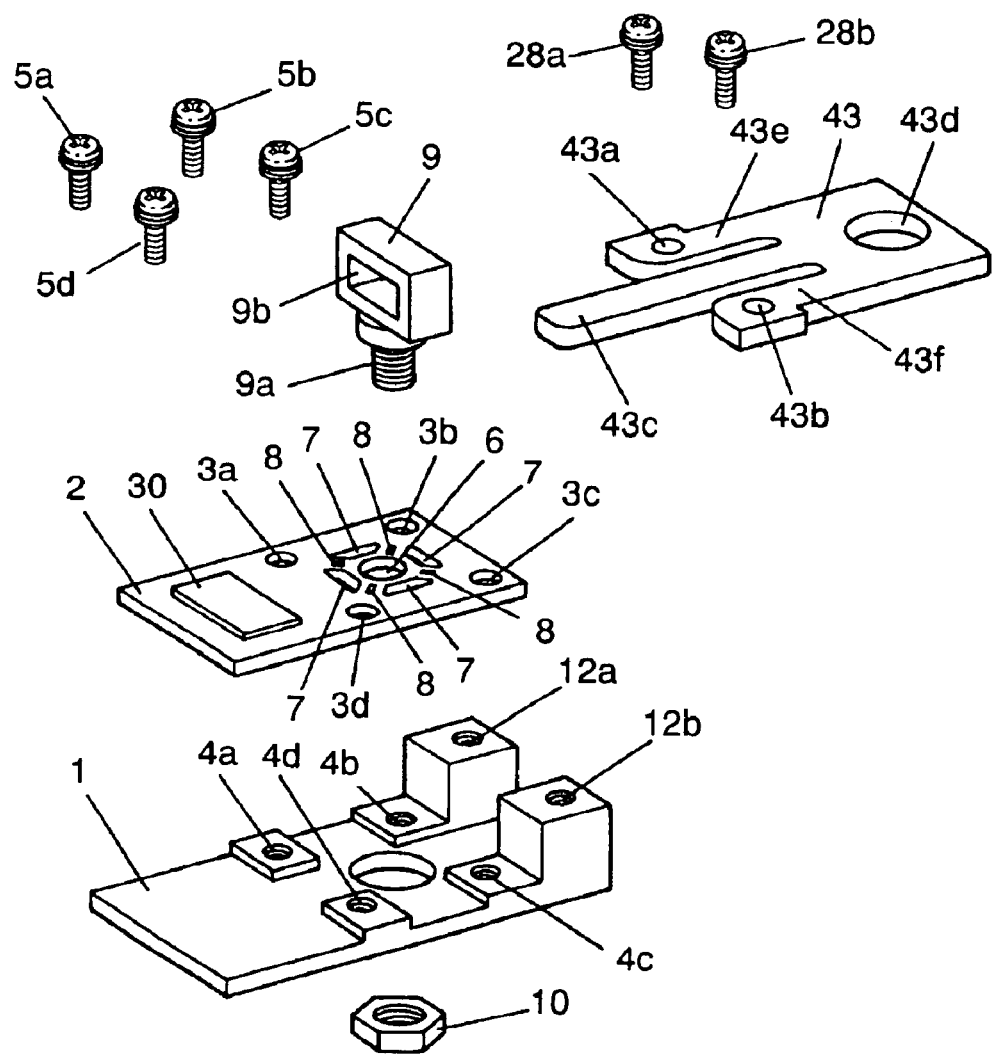
FIG. 13 is an exploded view of a fourth preferred embodiment of the present invention.
Figure 14:
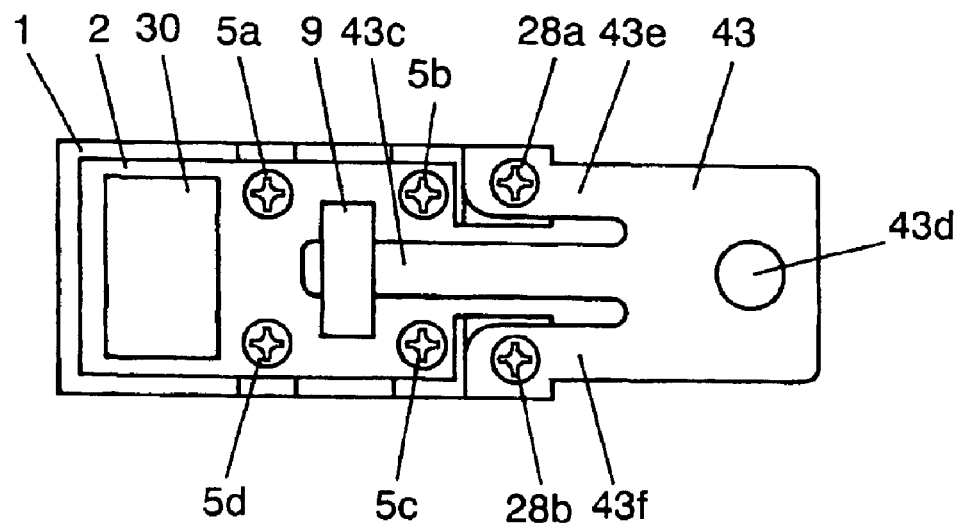
FIG. 14 is a side sectional view of the fourth preferred embodiment of the present invention.
Figure 15:
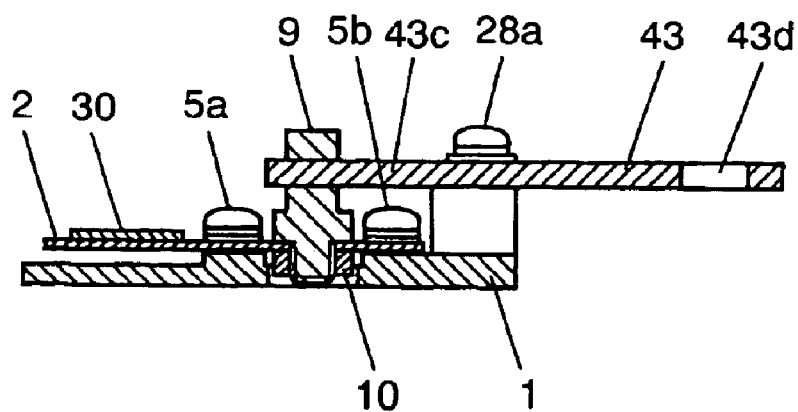
FIG. 15 is a plan view of the fourth preferred embodiment of the present invention.
Figure 16A:
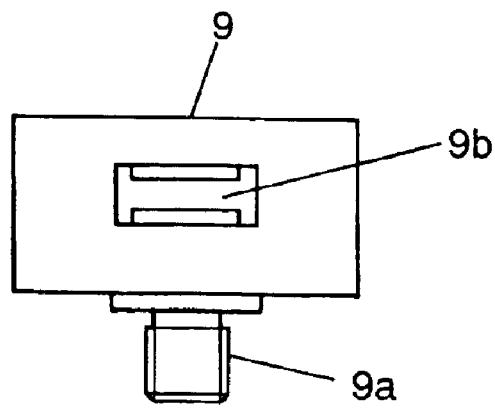
FIG. 16A is a front view of a fining pin showing a modified configuration of the fourth preferred embodiment of the present invention.
Figure 16B:
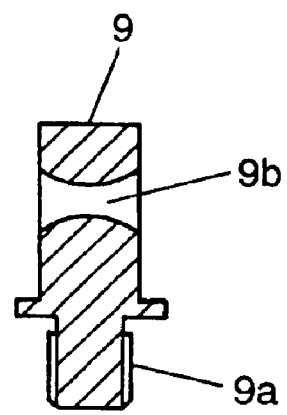
FIG. 16B is a side view of the modified configuration of the fourth preferred embodiment.
Figure 17A:
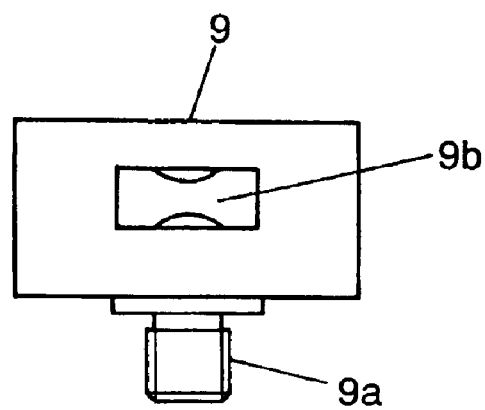
FIG. 17A is a front view of a fitting pin showing a second modified configuration of the fourth preferred embodiment of the present invention.
Figure 17B:
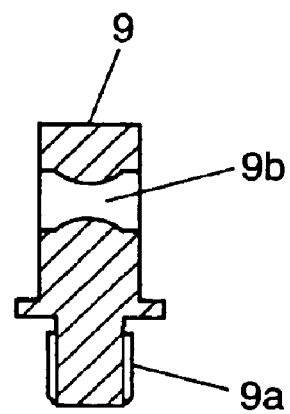
FIG. 17B is a side view of the second modified configuration of the fourth preferred embodiment of the present invention.

The weight measuring device in the fourth preferred embodiment of the present invention will be described with reference to FIG. 13 through FIG. 17. FIG. 13 is an exploded perspective view showing an essential portion of the device in the present preferred embodiment. FIG. 14 is a plan view of the device of the present preferred embodiment. FIG. 15 is a side sectional view of the device of the present preferred embodiment. FIGS. 16A and 16B are a front view and a side sectional view of a fitting pin showing a modified configuration in the present preferred embodiment. FIGS. 17A and 17B are a front view and a side sectional view of a fitting pin showing a second modified configuration of the present preferred embodiment.

In the present preferred embodiment, the base 1 fixed to an object such as chassis 50 is provided with tapped holes 4a, 4b, 4c, 4d for fixing the strain substrate 2, and tapped holes 12a, 12b for fixing leaf spring 43 at positions higher than the tapped holes 4a through 4d. The structure, arrangement, and function of the strain detection substrate 2 are the same as those in the first preferred embodiment.

Fitting pin 9 is made of a material capable of withstanding a load higher than the measuring load, and is provided with a threaded portion 9a at the lower part, and an insert portion 9b at a head thereof. Also, the fitting pin 9 is inserted into the hole 6 of strain detection substrate 2 and fixed by a nut 10.

A leaf spring 43 is made of a material capable of withstanding a load higher than the measuring load the same as the fitting pin 9, and a middle beam 43c at a tip end portion thereof is inserted into the insert portion 9b of the fitting pin 9 and is held therein. Also, fixing holes 43a, 43b are formed in end beams 43e, 43f at both sides of the leaf spring 43 which is fixed by screws 28a, 28b to the tapped holes 12a, 12b of the base 1. The insert portion 9b of fitting pin 9 and the middle beam 43c of the leaf spring 43 are substantially the same in height. Also, at another end portion of the leaf spring 43 is formed fixing hole 43d as a load input portion to be attached to the object to be measured.

A method of assembling these components will be described in the following.

First, the fitting pin 9 is fixed to the strain detection substrate 2 by the nut 10. Next, the strain detection substrate 2 is fixed to the base 1 with screws 5a, 5b, 5c, 5d. Further, the middle beam 43c of the leaf spring 43 is inserted into the insert portion 9b of the fitting pin 9, and is the leaf spring 43 fastened to the tapped holes 12a, 12b of the base 1 by screws 28a, 28b through fixing holes 43a, 43b.

The operation will be described in the following with reference to FIG. 15.

When a weight of the object to be measured is applied to the fixing hole 43d serving as the load input portion of the leaf spring 43 of the weight measuring device assembled as described above, a force is transferred to lift up the fitting pin 9 via the middle beam 43c of the leaf spring 43 fixed to the base 1. Since the fitting pin 9 is fixed to the strain detection substrate 2, a strain is generated in the strain detection substrate 2 by a force to lift up the fitting pin 9. Accordingly, a resistance of the strain resistor 8 changes, and the change of the resistance is computed in the processing circuit 30 to measure the load.

The end portion of the leaf spring 43 is fork-shaped and only the middle beam 43c is held by the fitting pin 9, and therefore, a load reduced at a specific ratio against the input load is applied to the strain detection substrate 2. Also, it is possible to reduce the load applied to the strain detection substrate 2 at a specific ratio by changing a length of notched portions or a width of the middle beam 43c of the fork-shaped portion of the leaf spring 43, or by properly changing a distance from the fixing holes 43a, 43b of the end beams 43e, 43f at both side ends of leaf spring 43 to the fitting pin 9.

In the present preferred embodiment, since the two end portions of the end beams 43e, 43f at both side ends of the leaf spring 43 are fastened to the tapped holes 12a, 12b, a load in a direction perpendicular to the load detecting direction is hard to be transferred to the fitting pin 9. Accordingly, it is possible to suppress unnecessary output generated due to the load in the direction perpendicular to the load detecting direction, and to improve the load detecting accuracy. Also, even against an impact given in the direction perpendicular to the load detecting direction, it is possible to prevent the breakdown of the strain detection substrate 2.

Further, by forming inner walls in the insert portion 9b of the fitting pin 9 arcuate in shape as shown in FIGS. 16A and 16B, or semicircular as shown in FIGS. 17A and 17B, a contacting portion between the inner wall formed in the insert portion 9b of the fitting pin 9 and the middle beam 43c of leaf spring 43 becomes a line or a point. Therefore, it is possible to reduce friction between the two components and also to suppress transfer of unnecessary load generated due to twisting or the like. As a result, the stability of the sensor output against the load may be further enhanced.

Also, since the device of the present preferred embodiment is unitized, when the device is attached to a vehicle seat, for example, it is possible to reduce the number of assembling steps and it is unnecessary to adjust the sensor characteristics during assembly.

Fifth Preferred Embodiment

Figure 18:
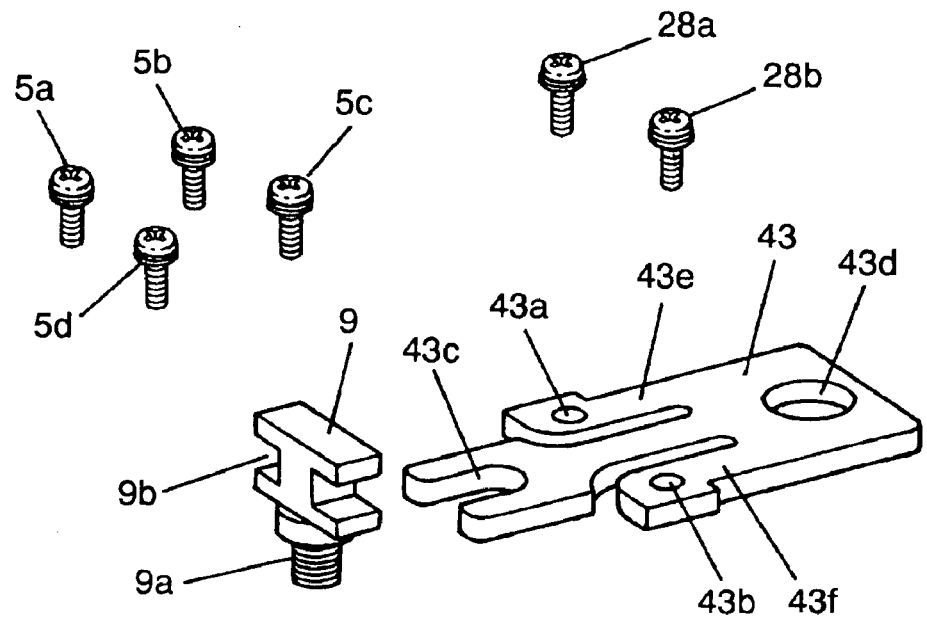
FIG. 18 is an exploded perspective view of a fifth preferred embodiment of the present invention.
Figure 18:
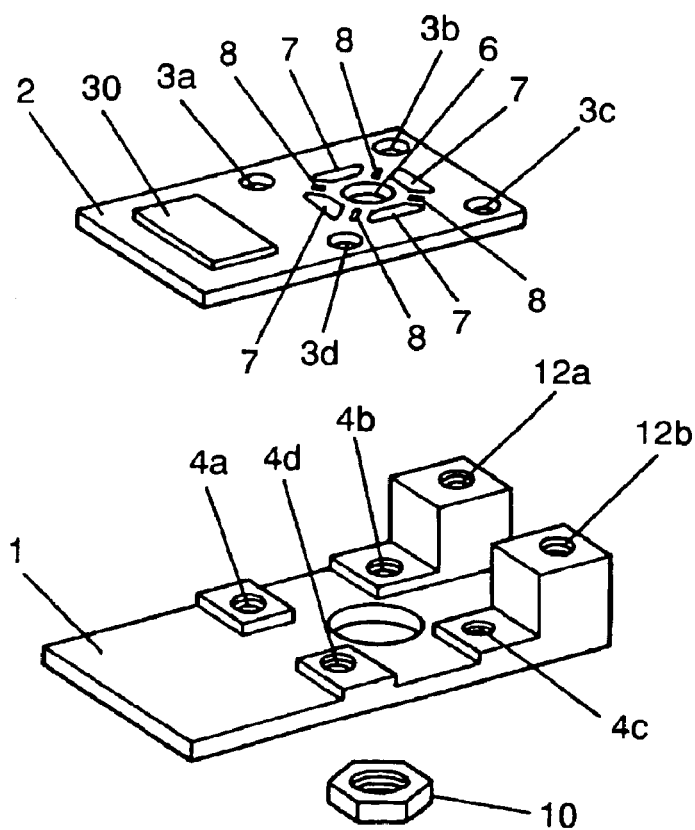
Figure 19:
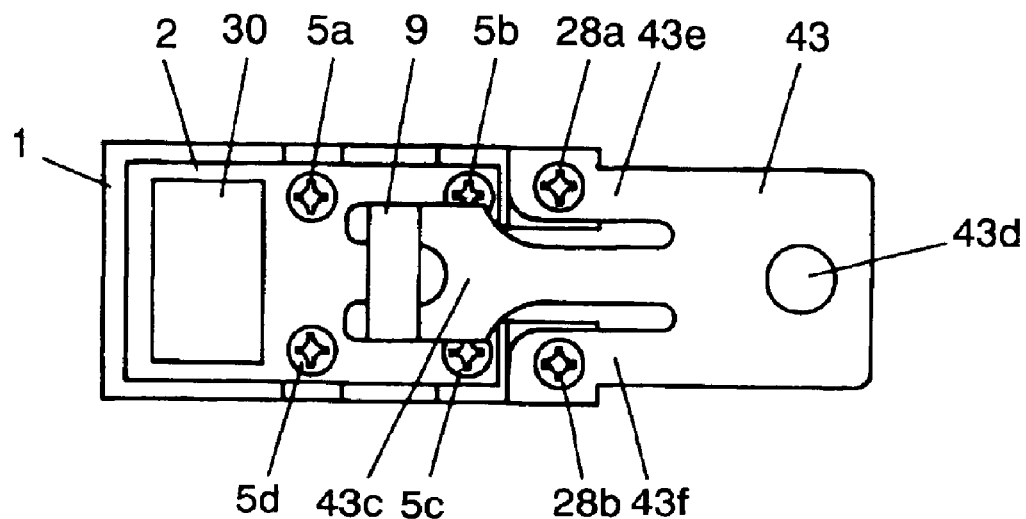
FIG. 19 is a side sectional view of the fifth preferred embodiment of the present invention.
Figure 20:
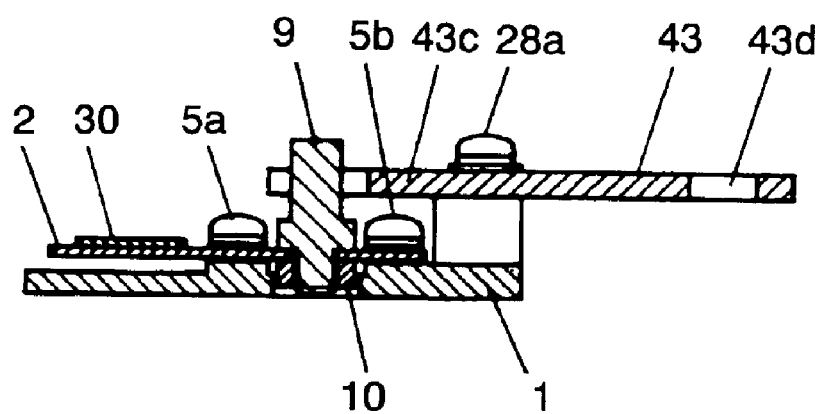
FIG. 20 is a plan view of the fifth preferred embodiment of the present invention.
Figure 21A:
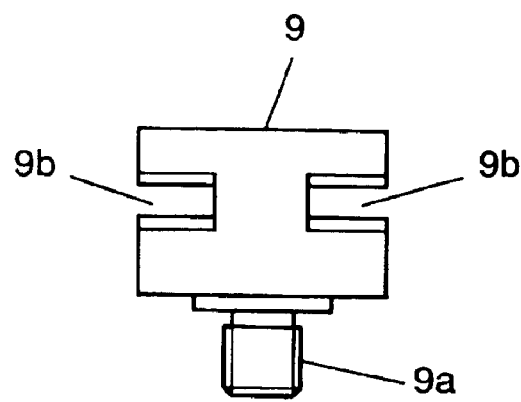
FIG. 21A is a front view of a fitting pin showing a modified configuration of the fifth preferred embodiment of the present invention.
Figure 21B:
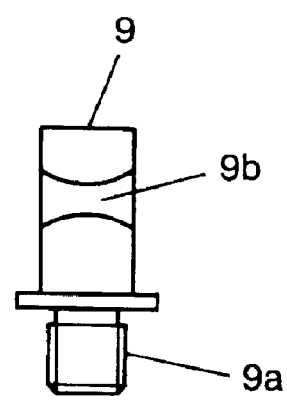
FIG. 21B is a side view of the modified configuration of the fifth preferred embodiment of the present invention.
Figure 22A:
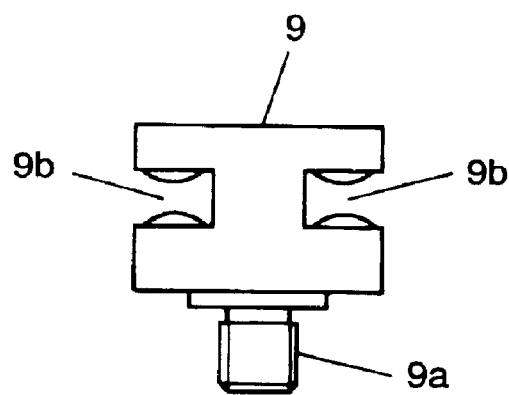
FIG. 22A is a front view of a fitting pin showing a second modified configuration of the fifth preferred embodiment of the present invention.
Figure 22B:
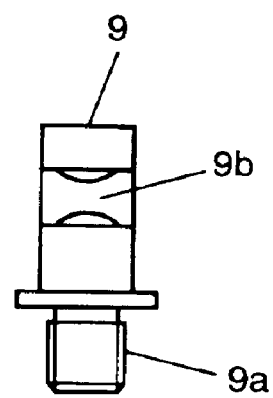
FIG. 22B is a side view of the second modified configuration of the fifth preferred embodiment of the present invention.

The weight measuring device in the fifth preferred embodiment of the present invention will be described with reference to FIG. 18 through FIG. 22B. FIG. 18 is an exploded perspective view of the device in the present preferred embodiment. FIG. 19 is a plan view of the device. FIG. 20 is a side sectional view. FIGS. 21A and 21B are a front view and a side view of a fitting pin showing a modified configuration in the present preferred embodiment. FIGS. 22A and 22B are a front view and a side view of a fitting pin showing a second modified configuration of the present preferred embodiment.

In the present preferred embodiment, the same components as in the fourth preferred embodiment are given the same numerals, and the detailed descriptions of the same are omitted, and only differences will be described in detail.

As shown in FIG. 18, in the present preferred embodiment, the middle beam 43c of the leaf spring 43 in the fourth preferred embodiment 4 is divided into a U-shape, while the insert portion 9b of the fitting pin 9 is H-shaped in section. This configuration makes it easier to hold the middle beam 43c on the fitting pin 9, and simplifies the shape of the fitting pin 9, thereby improving the workability.

Also, as in the fourth preferred embodiment, it is preferable to form the inner walls of the insert portion 9b of fitting pin 9 arcuate in shape as shown in FIGS. 21A and 21B, or semicircular as shown in FIGS. 22A and 22B. By this configuration, it is possible to reduce the friction between the two components and to suppress the transfer of unnecessary load generated due to a twisting or the like. As a result, the stability of sensor output against the load may be further enhanced.

Sixth Preferred Embodiment

Figure 23:
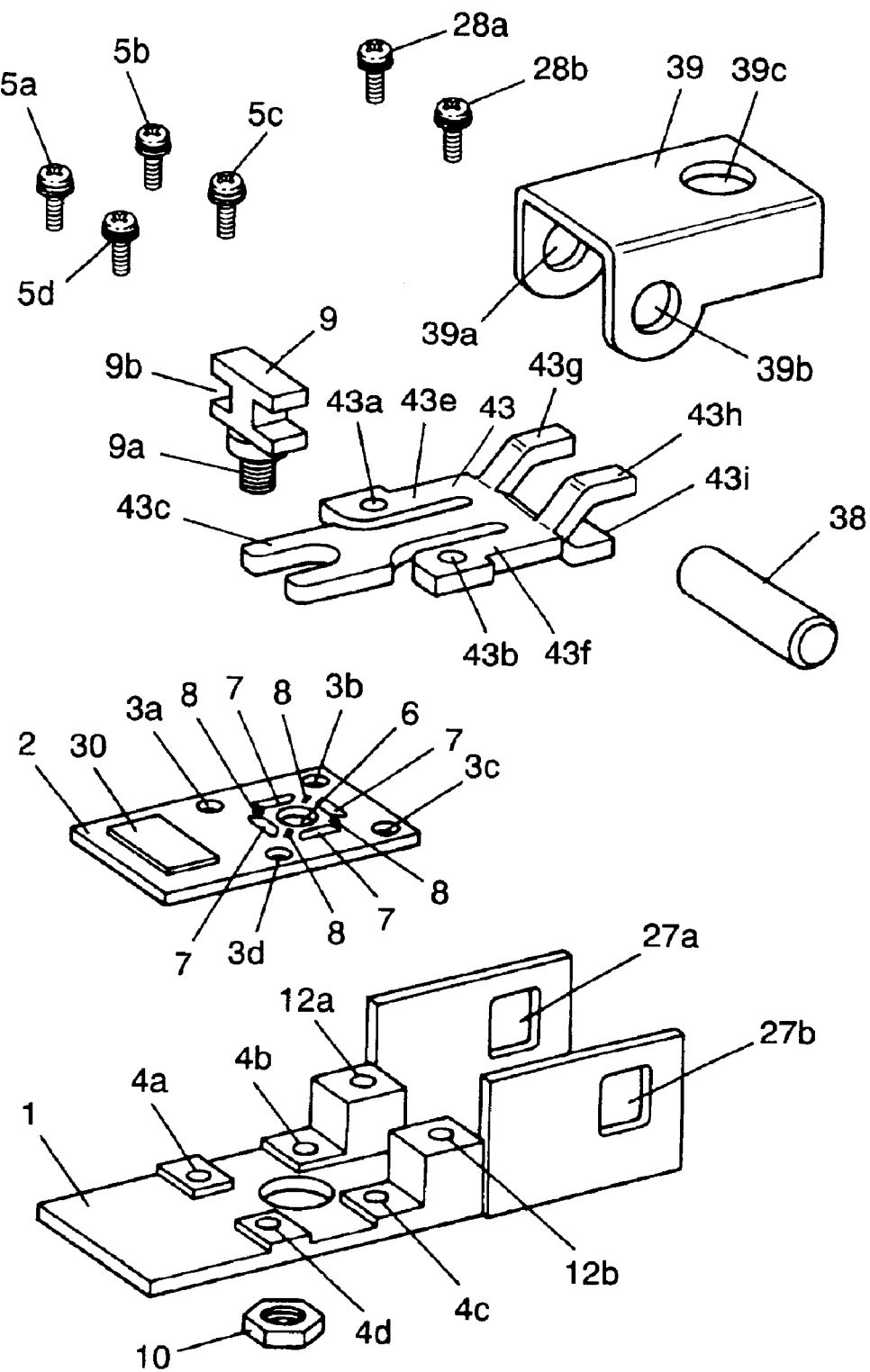
FIG. 23 is an exploded perspective view of a sixth preferred embodiment of the present invention.
Figure 24:
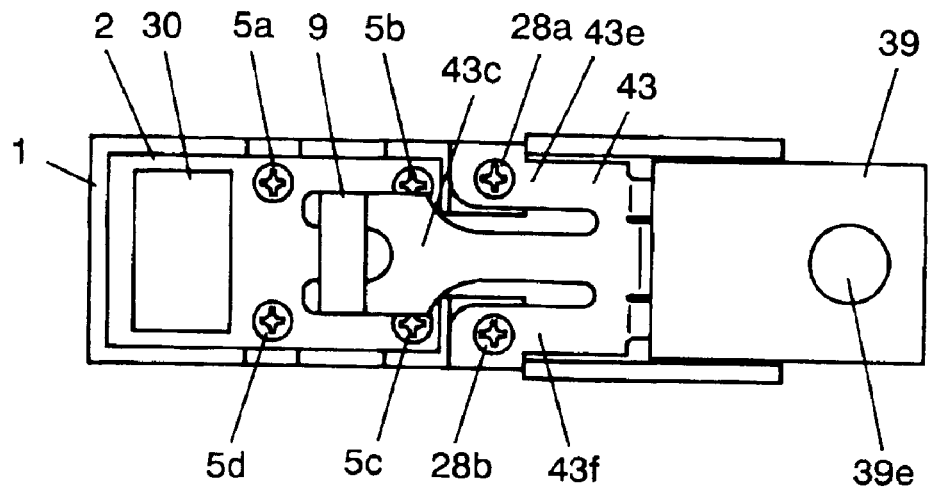
FIG. 24 is a side sectional view of the sixth preferred embodiment of the present invention.
Figure 25:
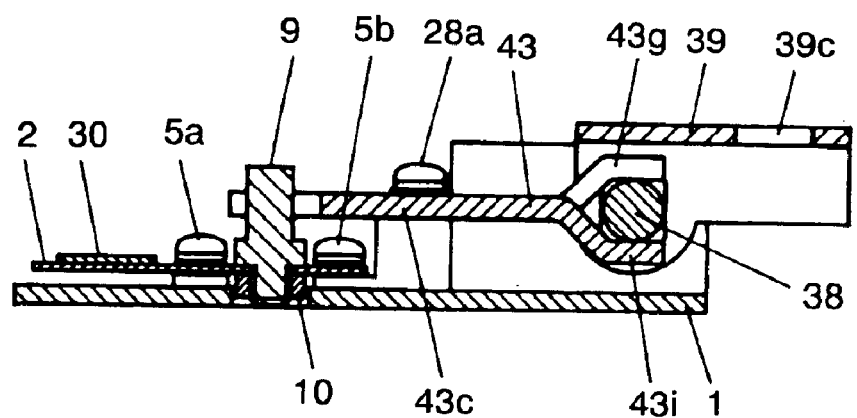
FIG. 25 is a plan view of the sixth preferred embodiment of the present invention.

The weight measuring device in the sixth preferred embodiment of the present invention will be described with reference to FIG. 23 through FIG. 25. FIG. 23 is an exploded perspective view showing the sixth preferred embodiment. FIG. 24 is a plan view, and FIG. 25 is a side sectional view of the device.

In the present preferred embodiment, the same components as in the fourth preferred embodiment are given the same numerals, and the detailed descriptions of the same are omitted, and only differences will be described in detail.

In the present preferred embodiment, as shown in FIG. 23, a load input end side of leaf spring 43 is divided into three portions, and side holding portions 43g, 43h and middle holding portion 43i are bent opposite to each other so that the leaf spring 43 can be held by link pin 38. And, there is provided arm 39 having fixing hole 39c to be attached to a load applied portion, which is suspended by the link pin 38 via holes 39a, 39b. Also, in the side walls of the base 1 are formed slots 27a, 27b for vertically guiding the link pin 38 and for controlling an amount of distortion of the leaf spring pin 43.

In the device configured as described above, since the arm 39 to which a weight of the object to be measured is applied is supported by the link pin 38, the arm 39 always receive the load in a parallel state, and can correctly transfer the load to the strain detection substrate 2 via the leaf spring 43.

Also, regarding a permanent deformation or a breakdown of the leaf spring 43 and the strain detection substrate 2 with a load exceeding the maximum measuring load, they are prevented by the configuration where the link pin 38 comes in contact with the end portions of slots 27a, 27b formed in the side walls of the base 1 and function as stoppers.

Seventh Preferred Embodiment

Figure 26:
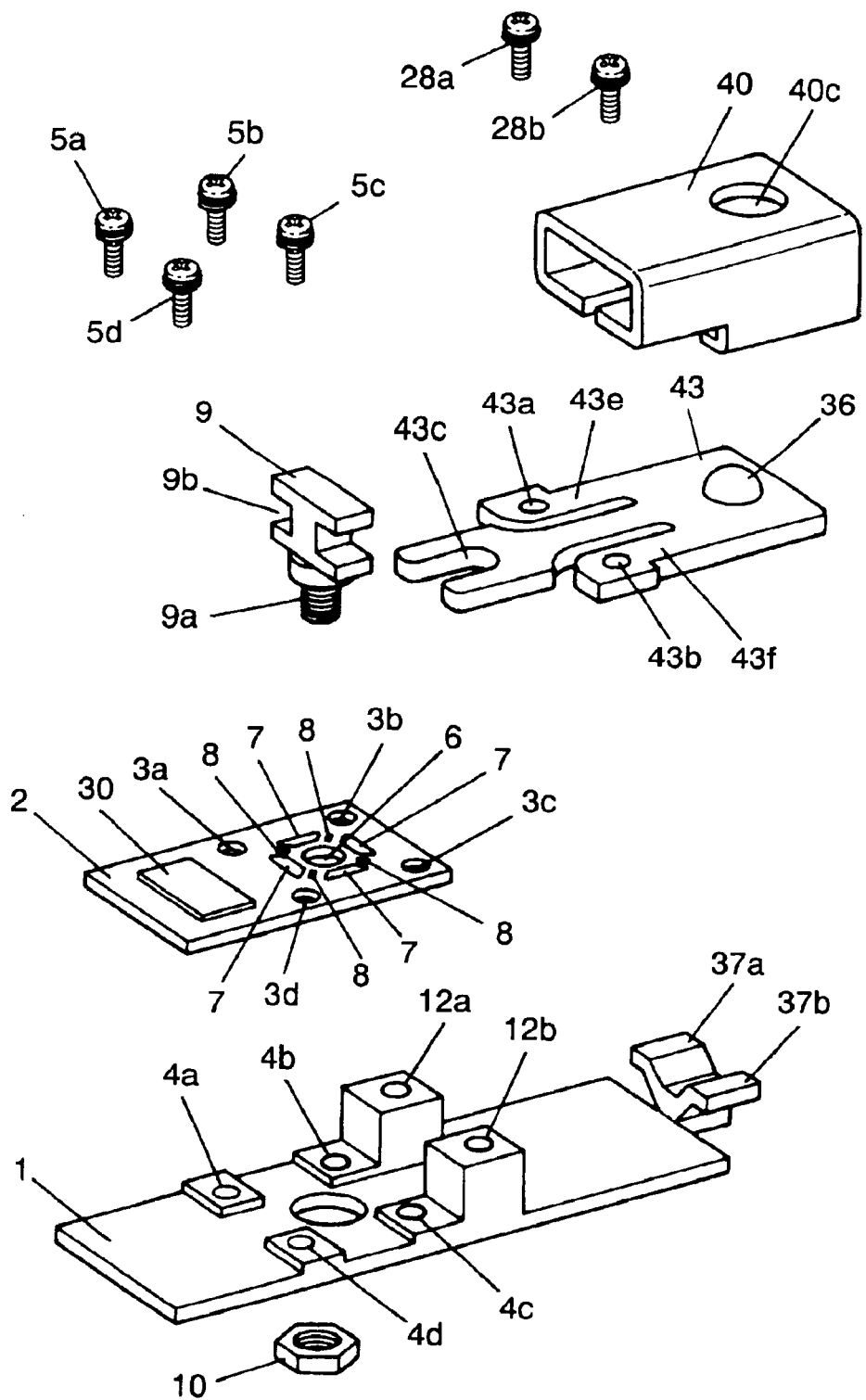
FIG. 26 is an exploded perspective view of a seventh preferred embodiment of the present invention.
Figure 27:
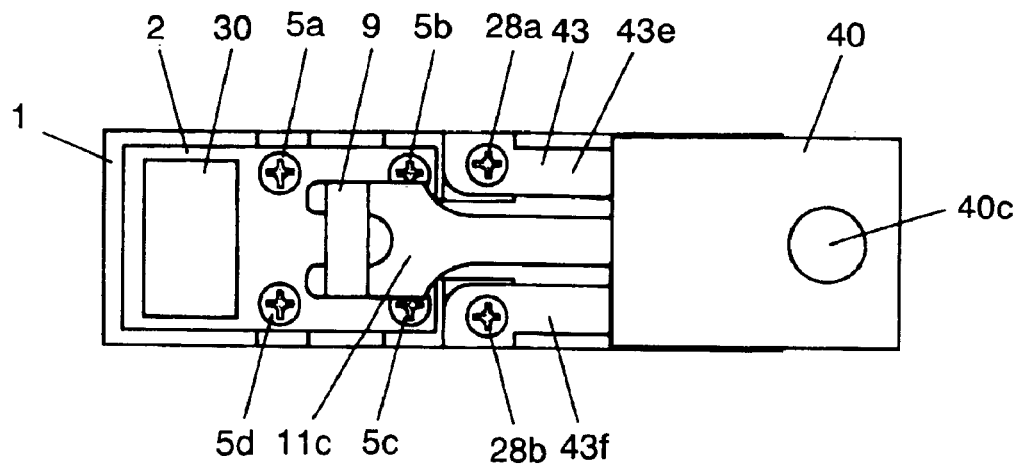
FIG. 27 is a side sectional view of the seventh preferred embodiment of the present invention.
Figure 28:
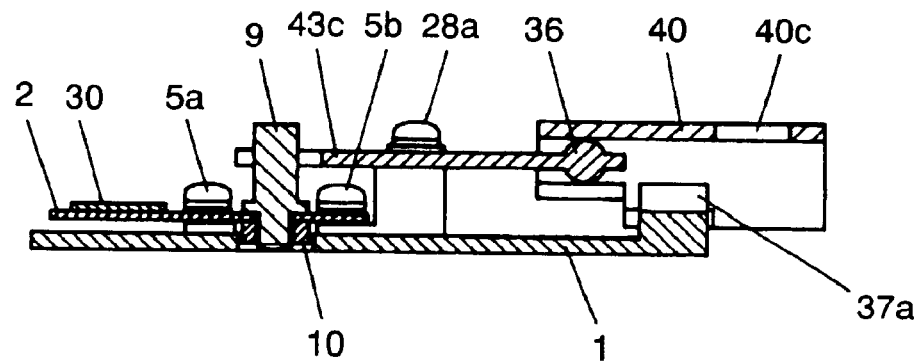
FIG. 28 is a plan view of the seventh preferred embodiment of the present invention.

A weight measuring device in the seventh preferred embodiment of the present invention will be described with reference to FIG. 26 through FIG. 28. FIG. 26 is an exploded perspective view showing the present preferred embodiment. FIG. 27 is a plan view, and FIG. 28 is a side sectional view of the equipment.

In the seventh preferred embodiment the same components as in the fourth preferred embodiment are given the same numerals, and the detailed descriptions of the same are omitted, and only differences will be described in detail.

As shown in FIG. 26, a load input end side of leaf spring 43 is provided with a semicircular projection 36. An arm 40 is substantially box-shaped, and at a top thereof is formed a hole 40c to be attached to a load applied portion. Also, V-shaped ribs 37a, 37b are provided at an end portion of the base 1. The arm 40 holds the semicircular projection 36 formed on the leaf spring 43 in such manner as to enclose the semicircular projection 36, and is disposed in a substantially parallel arrangement to the V-shaped ribs 37a, 37b provided at the end portion of the base 1.

In the equipment having a configuration as described above, since the arm 40 to which the weight of the object to be measured is applied is supported by the semicircular projection 36 formed at the load input side of the leaf spring 43, and always receive the load at one point, it is possible to avoid unnecessary output generated due to a twisting or the like applied to the arm 40.

Also, as a stopper structure against a load or impact load higher than the maximum measuring load, a clearance is provided between the bottom inner surface of arm 40 and the ribs 37a, 37b for an amount of maximum displacement of the leaf spring 43 for the maximum measuring load against an upper displacement of the arm 40 in the up-and-down direction. Also, a clearance is provided between a bottom outer surface of arm 40 and the base surface of base 1 for an amount of maximum displacement of the leaf spring 43 for the maximum measuring load against the lower displacement of the arm 40 in the up-and-down direction. In this way, even when a load or an impact load higher than the maximum measuring load is applied in the up-and-down direction, the stopper structure receives the load, protecting the strain detection substrate 2 from excessive load, and prevents the breakdown of the strain detection substrate 2 and the leaf spring 43.

Eighth Preferred Embodiment

Figure 29:
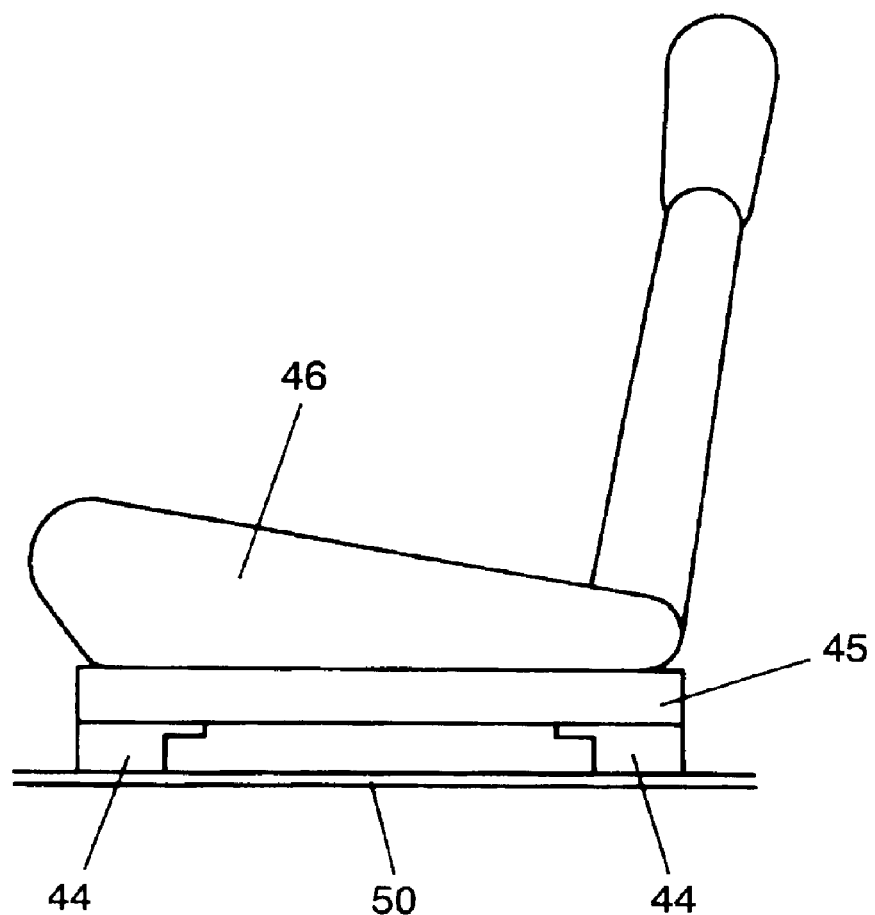
FIG. 29 is a side view illustrating a seat for vehicles furnished with any one of the weight measuring equipments of the first through seventh equipment of the present invention.

FIG. 29 is a side view for describing a vehicle seat attached with any one of the devices shown in FIG. 1, FIG. 4, FIG. 10, FIG. 13, FIG. 18, FIG. 23 and FIG. 26.

A seat truck 45 is disposed beneath a seat (such as a passenger seat) 46. The load input end side of the device 44 of the present invention is attached by bolts and nuts (not shown) to the seat truck 45. On the other hand, the base 1 of the device 44 is similarly fixed by bolts and nuts (not shown) to chassis 50. The devices 44 are disposed at front and rear ends of the seat truck 45 so as to correspond to the four bottom corners of the seat 46. In this condition, the weight of the person actually sitting on the seat 46 is measured by the devices 44 disposed at four portions and computed to judge the weight. At the time, a weight of the seat 46 itself is compensated for by previously setting or storing it in a memory. As described above, since the devices 44 are disposed at the front and the rear ends of the seat trucks 45 in such manner as to correspond to the four bottom corners of the seat 46, it is possible to judge the weight even when the position of the person sitting on the seat is changed, and also, to estimate the sitting position by comparing the loads.

In the above description, an example of disposing four weight measuring devices at the bottom of the seat 46 has been described, but the number of the weight measuring devices disposed is not limit to four. It is also preferable to install one or two weight measuring devices at a side opposite to the front or rear support portion of the seat which is rotatably supported, and further, to increase the number of the weight measuring devices disposed in order to improve measuring accuracy.

Also, similar results can be obtained by installing the weight measuring device 44 between the seat 46 and the seat truck 45, although the configuration is not shown. In this case, since the weight of the seat truck 45 is not superposed on the strain detection substrate 2, the weight to be corrected is less, improving the computing or previous setting accuracy, and as a result, the accuracy of detection can be enhanced.

As described above, it is possible to realize reliable person weight measuring equipment by disposing an appropriate number of the weight measuring devices of the present invention under a vehicle seat.

INDUSTRIAL APPLICABILITY

According to the present invention, it is possible to obtain a weight measuring device having a reduced in a load applied to the strain detection substrate and improved detecting resolution. Also, since the weight measuring device is unitized, it can be easily built into various types of equipment including seats for vehicles.

What is claimed is:

1. A weight measuring device comprising:
   a base arranged to be fixed to an object to be mounted;
   a strain detection substrate attached to said base;
   a fitting pin fixed to said strain detection substrate;
   a first arm rotatably attached to said base by a support pin;
   a leaf spring having one end fixed to said first arm and another end supported by said fitting pin;
   a link pin supported by a guide hole, said link pin being movable in a direction perpendicular to a bottom of said base, said guide hole formed in said base, and being supported by a slide hole to be movable in a direction parallel to the bottom of said base, said slide hole formed in said first arm; and
   a second arm having one end for receiving a load of an object to be measured, and another end fixed to said first arm by said link pin.

2. The weight measuring device of claim 1, wherein a part of said first arm or said second arm comes into contact with the base when a load exceeds a maximum measuring load of said weight measuring device.

3. The weight measuring device of claim 1, wherein said leaf spring is provided with a predetermined clearance from said fitting pin at a portion supported by said fitting pin.

4. The weight measuring device of claim 1, wherein an inner wall of said fitting pin at a portion for supporting said leaf spring has one of an arcuate shape and a semicircular shape.

5. A weight measuring device comprising:
   a base arranged to be fixed to an object to be mounted, said base having a slot formed therein;
   a strain detection substrate attached to said base;
   a fitting pin fixed to said strain detection substrate;
   a fixing pin fixed to said base;
   a leaf spring supported by said fitting pin and said fixing pin at both ends thereof; and
   an arm connected nearly to a middle portion of said leaf spring, said arm being movable in an up-and-down direction by receiving a weight of an object to be measured;
   wherein a shaft which supports said leaf spring is movable in an up-and-down direction in said slot formed in said base.

6. The weight measuring device of claim 5, wherein said leaf spring is provided with a predetermined clearance from said fixing pin at a portion supported by said fixing pin.

7. The weight measuring device of claim 5, wherein said shaft comes into contact with an inner wall of said slot when a load exceeds a maximum measuring load of said weight measuring device.

8. A weight measuring device comprising:
   a base arranged to be fixed to an object to be mounted;
   a strain detection substrate attached to said base;
   a fitting pin fixed to said strain detection substrate; and
   a leaf spring having a fork-shaped first end comprising three beams, and a second end of said leaf spring comprising a load applied portion for receiving a load, wherein said fitting pin has an insert portion for holding a middle beam of said three beams, and wherein outer beams at both sides of said three beams have ends fixed to said base, respectively.

9. The weight measuring device of claim 8, wherein the middle beam of said leaf spring held by said fitting pin is one of straight and divided in shape.

10. The weight measuring device of claim 8, wherein said middle beam is narrower in width than the beams at both sides.

11. The weight measuring device of claim 8, wherein an inner wall of a portion for supporting said middle beam of said fitting pin is one of arcuate and semicircular in shape.

12. The weight measuring device of claim 8, wherein the load applied portion side of said leaf spring is divided into three portions, both of side portions and a middle portion of said three portions divided being bent opposite to each other and held by a link pin, and said link pin supports an arm provided with a fixing hole for the load applied portion.

13. The weight measuring device of claim 8, wherein a semicircular projection is disposed at the load applied portion side of said leaf spring, and said arm is arranged so as to hold said semicircular projection.

14. The weight measuring device of claim 8, wherein a stopper for controlling an amount of deformation of said leaf spring is provided.

15. The weight measuring device of claim 1, wherein said base is fixed to the chassis side of a vehicle, and one of said first arm and said second arm is connected to a seat truck bottom of a vehicle seat.

16. The weight measuring device of claim 1, wherein said base is fixed to a seat truck of a vehicle seat, and one of said first arm and said second arm is connected to the vehicle seat.

17. Person weight measuring equipment comprising the weight measuring device of claim 1, said base of said weight measuring device being fixed to a chassis side, and one of said first arm and said second arm of said weight measuring device being fixed to a seat truck bottom of a vehicle seat, wherein a seat weight and person weight are measured by a load detected by said weight measuring device.

18. Person weight measuring equipment comprising the weight measuring device of claim 1, said base of said weight measuring device being fixed to a seat truck of a vehicle seat, and
one of said first arm and said second arm of said weight measuring device being fixed to said vehicle seat,
wherein a seat weight and person weight are measured by a load detected by said weight measuring device.

19. The person weight measuring equipment of claim 18, wherein said weight measuring equipment is installed at four corners of said vehicle seat.

20. The weight measuring device of claim 5, wherein said base is fixed to the chassis side of a vehicle, and
said arm is connected to a seat truck bottom of a vehicle seat.

21. The weight measuring device of claim 8, wherein said base is fixed to the chassis side of a vehicle, and
one of said leaf spring and an arm connected to said leaf spring is connected to a seat truck bottom of a vehicle seat.

22. The weight measuring device of claim 5, wherein said base is fixed to a seat truck of a vehicle seat, and said arm is connected to the vehicle seat.

23. The weight measuring device of claim 8, wherein said base is fixed to a seat truck of a vehicle seat, and one of said leaf spring and an arm connected to said leaf spring is connected to the vehicle seat.

24. Person weight measuring equipment comprising the weight measuring device of claim 5, the base of said weight measuring device being fixed to a chassis side, and
said arm of said weight measuring device being fixed to a seat truck bottom of a vehicle seat,
wherein a seat weight and person weight are measured by a load detected by said weight measuring device.

25. Person weight measuring equipment comprising the weight measuring equipment of claim 8, the base of said weight measuring device being fixed to a chassis side, and
one of said leaf spring and an arm connected to said leaf spring being fixed to a seat truck bottom of a vehicle seat,
wherein a seat weight and person weight are measured by a load detected by said weight measuring device.

26. Person weight measuring equipment comprising the weight measuring device of claim 5, the base of said weight measuring device being fixed to a seat truck of a vehicle seat, and
said arm of said weight measuring device being fixed to said vehicle seat,
wherein a seat weight and person weight are measured by a load detected by said weight measuring device.

27. Person weight measuring equipment comprising the weight measuring device of claim 8, the base of said weight measuring device being fixed to a seat truck of a vehicle seat, and
one of said leaf spring and an arm connected to said leaf spring being fixed to said vehicle seat,
wherein a seat weight and person weight are measured by a load detected by said weight measuring device.

28. Person weight measuring equipment comprising four weight measuring devices, each according to claim 8, wherein
said weight measuring devices are installed at four corners of a vehicle seat, respectively;
for each of said weight measuring devices, one of said leaf spring and an arm connected to said leaf spring is fixed to a seat truck bottom of said vehicle seat, and said base is fixed to a chassis side; and
seat weight and person weight are measured by a load detected by said weight measuring devices.

29. Person weight measuring equipment comprising four weight measuring devices, each according to claim 8, wherein
said weight measuring devices are installed at four corners of a vehicle seat, respectively;
for each of said weight measuring devices, one of said leaf spring and an arm connected to said leaf spring is fixed to said vehicle seat, and said base is fixed to a seat truck of a vehicle seat; and
seat weight and person weight are measured by a load detected by said weight measuring devices.

30. Person weight measuring equipment comprising four weight measuring devices, each according to claim 5, wherein
said weight measuring devices are installed at four corners of a vehicle scat, respectively;
for each of said weight measuring devices, said arm is fixed to a seat truck bottom of said vehicle seat, and said base is fixed to a chassis side; and
seat weight and person weight are measured by a load detected by said weight measuring devices.

31. Person weight measuring equipment comprising four weight measuring devices, each according to claim 5, wherein
said weight measuring devices are installed at four corners of a vehicle seat, respectively;
for each of said weight measuring devices, said arm is fixed to said vehicle seat, and said base is fixed to a seat truck of a vehicle seat; and
seat weight and person weight are measured by a load detected by said weight measuring devices.

32. Person weight measuring equipment comprising four weight measuring devices, each according to claim 1, wherein
said weight measuring devices are installed at four corners of a vehicle seat, respectively;
for each of said weight measuring devices, one of said first arm and said second arm is fixed to a seat truck bottom of said vehicle seat, and said base is fixed to a chassis side; and
seat weight and person weight are measured by a load detected by said weight measuring devices.

33. Person weight measuring equipment comprising four weight measuring devices, each according to claim 1, wherein
said weight measuring devices are installed at four corners of a vehicle seat, respectively;
for each of said weight measuring devices, one of said first arm and said second arm is fixed to said vehicle seat, and said base is fixed to a seat truck of a vehicle seat; and
seat weight and person weight are measured by a load detected by said weight measuring devices.

* * * * *